(12) United States Patent
Fitzgerald (10) Patent No.: US 10,550,915 B2
(45) Date of Patent: Feb. 4, 2020

(54) POWER TRANSMISSION ASSEMBLY WITH FACE MOUNTED BI-DIRECTIONAL SHIFT CLUTCHES

(71) Applicant: MAGNA POWERTRAIN OF AMERICA, INC., Troy, NY (US)

(72) Inventor: Brian M. Fitzgerald, Cazenovia, NY (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 1041 days.

(21) Appl. No.: 14/945,798

(22) Filed: Nov. 19, 2015

(65) Prior Publication Data

US 2016/0069429 A1    Mar. 10, 2016

Related U.S. Application Data

(63) Continuation of application No. 12/510,475, filed on Jul. 28, 2009, now abandoned.

(60) Provisional application No. 61/084,285, filed on Jul. 29, 2008.

(51) Int. Cl.
*F16H 3/00* (2006.01)
*F16D 15/00* (2006.01)
*F16H 3/091* (2006.01)

(52) U.S. Cl.
CPC ............. *F16H 3/006* (2013.01); *F16D 15/00* (2013.01); *F16H 3/091* (2013.01); *Y10T 74/19284* (2015.01)

(58) Field of Classification Search
CPC .. F16H 3/006; F16H 3/091; F16H 2200/0056; F16H 2200/0008; F16H 3/89; F16D 15/00; F16D 41/088; F16D 41/064
See application file for complete search history.

(56) References Cited

U.S. PATENT DOCUMENTS

| 909,891 | A | 1/1909 | Hanson | |
|---|---|---|---|---|
| 6,619,151 | B2 * | 9/2003 | Shioiri | F16H 3/089 192/44 |
| 7,004,875 | B2 | 2/2006 | Williams et al. | |
| 7,779,978 | B2 * | 8/2010 | Joki | F16D 41/086 192/35 |
| 2004/0220010 | A1 | 11/2004 | Williams | |
| 2006/0150760 | A1 * | 7/2006 | Maguire | F16D 23/04 74/331 |

(Continued)

*Primary Examiner* — David J Hlavka
(74) *Attorney, Agent, or Firm* — Dickinson Wright PLLC (57) ABSTRACT

A power transmission assembly includes an input member adapted to receive drive torque from a source of torque, an output member adapted to provide drive torque to an output device and a bi-directional roller clutch including a first ring fixed for rotation with one of the input and output members. A second ring is spaced apart from the other of the input and output members. Rollers are positioned in aligned cam tracks formed in facing surfaces of the first and second rings. Neither the first ring nor the second ring support the input member or the output member on the other. The second ring may circumferentially index relative to the first ring for causing the rollers to ride up the cam tracks and force the second ring to frictionally engage the other of the input and output members, thereby establishing a drive connection between the input and output members.

19 Claims, 9 Drawing Sheets

(56) References Cited

U.S. PATENT DOCUMENTS

2008/0128233 A1\* 6/2008 Joki ..................... F16D 41/063
　　　　　　　　　　　　　　　　　　192/45.1

\* cited by examiner

POWER TRANSMISSION ASSEMBLY WITH FACE MOUNTED BI-DIRECTIONAL SHIFT CLUTCHES

CROSS-REFERENCE TO RELATED APPLICATIONS

This application is a continuation of U.S. patent application Ser. No. 12/510,475 filed on Jul. 28, 2009, which claims the benefit of U.S. Provisional Application No. 61/084,285, filed on Jul. 29, 2008. The entire disclosure of each of the above applications is incorporated herein by reference.

BACKGROUND

The present disclosure generally relates to power transmission assemblies for use in automotive vehicles. More particularly, a power transmission assembly with face mounted bi-directional shift clutches is disclosed.

A number of vehicles have been assembled with manual transmission or transaxle products. Typically, many development hours and dollars are expended to precisely fit a transmission within a particular vehicle. Components connected to or positioned near the transmission have particular characteristics to function in concert with each other. If a different transmission is subsequently desirable, changes to multiple components may be required depending upon the scope of the change of the transmission.

Typically, many dollars and hours are associated with the design and development of the tooling required to produce the components of a particular transmission design. Much of this tooling is dedicated to producing only components associated with the specific transmission for which it was initially constructed. A design change may render this tooling less useful.

A number of dual clutch transmissions have been designed to automate the shifting process and provide a power shift between sequentially numbered drive ratios. However, these transmissions may be substantially larger than a corresponding manual transmission having the same number of drive ratios. Other vehicle components may require modification to accommodate the new larger transmission. Accordingly, it may be desirable to provide an automated shift transmission sized to package within an existing manual transmission envelope to further advance the field.

SUMMARY

The present disclosure describes a power transmission assembly including a rotary input member adapted to receive drive torque from a source of torque, a rotary output member adapted to provide drive torque to an output device and a bi-directional roller clutch. The bi-directional roller clutch includes a first ring fixed for rotation with one of the rotary input member and the rotary output member. A second ring is spaced apart from the other of the rotary input member and the rotary output member. Rollers are positioned in aligned cam tracks formed in facing surfaces of the first and second rings. Neither the first ring nor the second ring support the rotary input member or the rotary output member relative to the other. The second ring is adapted to circumferentially index relative to the first ring to cause the rollers to ride up the cam tracks and cause the second ring to frictionally engage the other of the rotary input member and the rotary output member.

The present disclosure also provides a power transmission assembly including a first clutch adapted to drivingly couple a power source to a first input shaft and a second clutch adapted to drivingly couple the power source to a second input shaft. First, third and fifth drive gears are driven by the first input shaft. Second, fourth and sixth drive gears are driven by the second input shaft. First, second, third, fourth, fifth and sixth driven gears selectively drive a countershaft. The first through sixth drive gears are in meshed engagement with the corresponding first through sixth driven gears. A plurality of first through sixth bi-directional roller clutches are individually associated with respective first through sixth drive or driven gears and can be selectively actuated to establish at least six distinct gear drive ratios between the first and second input shafts and the countershaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figures 1, 2:
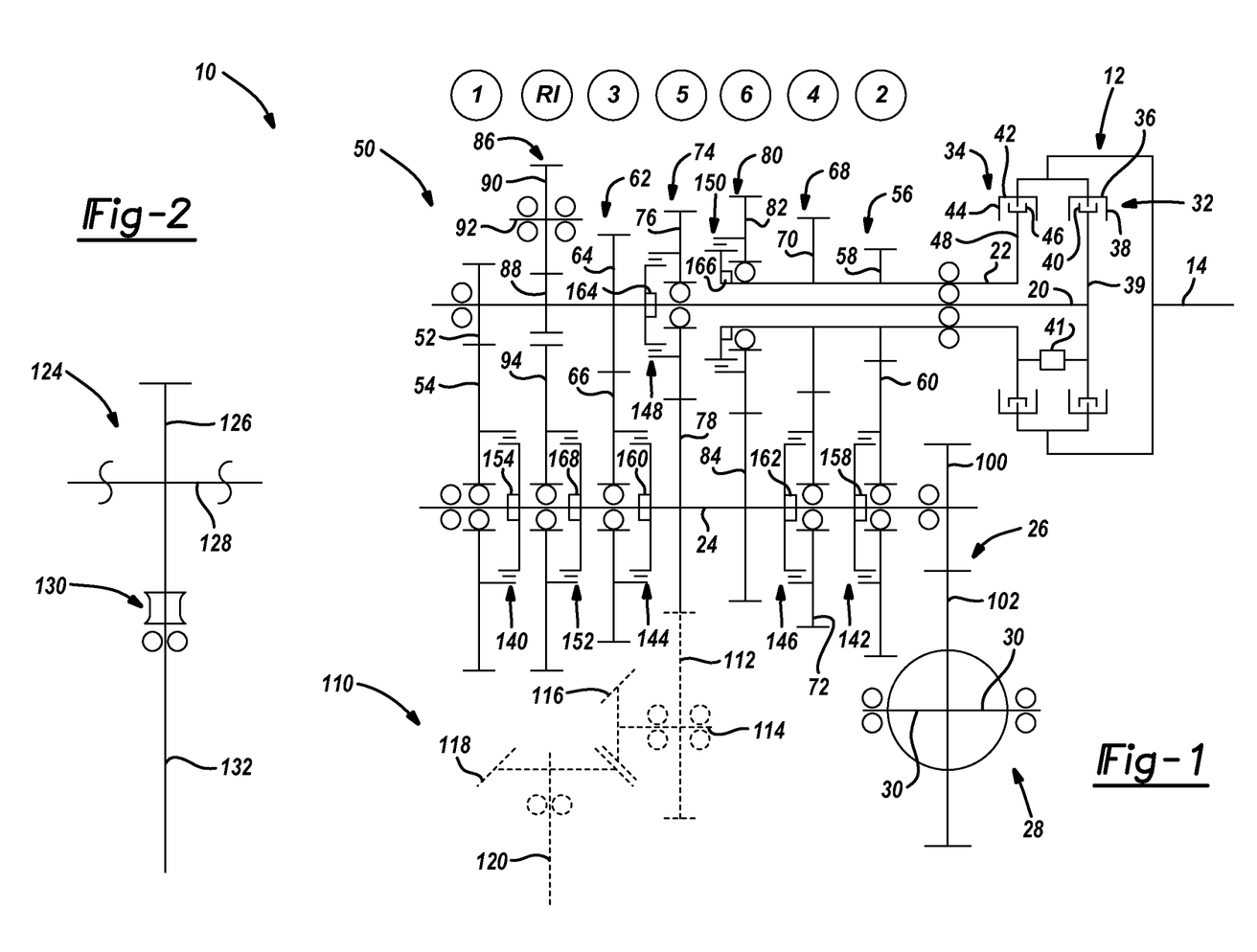
FIG. 1 is a schematic depicting a six-speed, dual clutch transmission equipped with face mounted bi-directional shift clutches and constructed in accordance with the teachings of the present disclosure.
FIG. 2 is a schematic depicting an optional power take-off arrangement for use with the transmission depicted in FIG. 1.

FIG. 1 is a schematic representing an automatic power-shift transmission 10 having a dual clutch 12 driven by a main shaft 14. During operation of dual clutch 12, torque may be transferred from main shaft 14 to one or both of a first input shaft 20 and a second input shaft 22. Second input shaft 22 is shaped as a tube having at least a portion of first input shaft 20 extending therethrough. Various speed gearsets are selectively operable to transfer torque from one of first input shaft 20 and second input shaft 22 to a countershaft 24. Power is transferred from countershaft 24 through a final drive 26 to a differential assembly 28. Axle shafts 30 are each driven by differential assembly 28 and fixed for rotation with a driven wheel (not shown).

Dual clutch 12 includes a first input clutch 32 and a second input clutch 34. First input clutch 32 is selectively operable to transfer torque from main shaft 14 to first input shaft 20. Similarly, second input clutch 34 is selectively operable to transfer torque from main shaft 14 to second input shaft 22. First input clutch 32 includes a first drum 36 fixed for rotation with main shaft 14. A set of outer first clutch plates 38 are fixed for rotation with and axially moveable relative to first drum 36. A set of inner first clutch plates 40 are fixed for rotation with a first hub 39. Inner first clutch plates 40 are axially moveable relative to hub 39 and interleaved with outer first clutch plates 38. Hub 39 is fixed for rotation with first input shaft 20. A power-operated dual clutch actuator unit 41 is operable to compress outer first clutch plates 38 with inner first clutch plates 40 to transfer torque through first input clutch 32. Clutch actuator unit 41 may be a purely electrical device, electro-mechanical or electro-hydraulic without departing from the scope of the present disclosure Second input clutch 34 includes a second drum 42 fixed for rotation with main shaft 14. A set of outer second clutch plates 44 are fixed for rotation with and axially moveable relative to second drum 42. A set of inner second clutch plates 46 are fixed for rotation with and axially moveable relative to a second hub 48. Hub 48 is fixed for rotation with second input shaft 22. Inner second clutch plates 46 are interleaved with outer second clutch plates 44. Dual clutch actuator unit 41 is operable to cause torque transfer through second input clutch 34 by compressing outer second clutch plates 44 against inner second clutch plates 46.

A first speed gearset 50 can be selectively engaged to transfer torque from first input shaft 20 to countershaft 24. First speed gearset 50 includes a first drive gear 52 fixed for rotation with first input shaft 20. A first driven gear 54 is supported for rotation on countershaft 24. First drive gear 52 is in constant meshed engagement with first driven gear 54. A second speed gearset 56 includes a second drive gear 58 fixed for rotation with second input shaft 22. A second driven gear 60 is rotatably supported on countershaft 24. Second drive gear 58 is in constant meshed engagement with second driven gear 60. A third speed gearset 62 can be selectively engaged to transfer torque from first input shaft 20 to countershaft 24 and includes a third drive gear 64 fixed for rotation with first input shaft 20. A third driven gear 66 is rotatably supported on countershaft 24. Third drive gear 64 is in constant meshed engagement with third driven gear 66. A fourth speed gearset 68 can be selectively engaged to transfer torque from second input shaft 22 to countershaft 24 and includes a fourth drive gear 70 fixed for rotation with second input shaft 22. A fourth driven gear 72 is rotatably supported on countershaft 24. Fourth drive gear 70 is in constant meshed engagement with fourth driven gear 72.

A fifth speed gearset 74 can be selectively engaged to transfer torque from first input shaft 20 to countershaft 24 and includes a fifth drive gear 76 rotatably supported on first input shaft 20 and a fifth driven gear 78 fixed for rotation with countershaft 24. Fifth drive gear 76 is in constant meshed engagement with fifth driven gear 78. A sixth speed gearset 80 can be selectively engaged to transfer torque from second input shaft 22 to countershaft 24 and includes a sixth drive gear 82 rotatably supported on second input shaft 22 and a sixth driven gear 84 rotatably supported on countershaft 24. Sixth drive gear 82 and sixth driven gear 84 are in constant meshed engagement with one another. A reverse gearset 86 includes a reverse drive gear 88 fixed for rotation with first input shaft 20. A reverse idler gear 90 is rotatably supported on an idler shaft 92. Reverse drive gear 88 and reverse idler gear 90 are in constant meshed engagement with one another. A reverse driven gear 94 is rotatably supported on countershaft 24. Reverse driven gear 94 is in constant meshed engagement with reverse idler gear 90 such that countershaft 24 rotates in an opposite direction when in the reverse gear ratio as compared to the sixth speed ratios previously described. Transmission 10 also includes first, second, third, fourth, fifth, sixth and reverse shifting mechanisms. In particular, FIG. 1 schematically depicts first through seventh face mounted bi-directional shaft clutches 140, 142, 144, 146, 148, 150 and 152, respectively. The bi-directional shift clutches will be described in detail hereinafter.

Final drive 26 includes an output drive gear 100 fixed for rotation with countershaft 24 and an output driven gear 102 fixed for rotation with a drive member of differential assembly 28. Output drive gear 100 and output driven gear 102 are in constant meshed engagement with one another. As previously mentioned, differential assembly 28 transfers power to axle shafts 30. The gearing arrangement previously described permits selective establishment of six forward drive ratios and one rear drive ratio for a two-wheel drive powertrain. FIG. 1 depicts an optional hypoid power take-off assembly 110 operable to transfer power from main shaft 14 to another set of driven axles (not shown). Because hypoid power take-off assembly 110 is optional, its components are shown in hidden line representation. Hypoid power take-off assembly 110 includes an output gear 112 fixed for rotation with a pinion shaft 114. Output gear 112 is in constant meshed engagement with fifth driven gear 78. A pinion gear 116 is formed at one end of pinion shaft 114. A hypoid gear 118 is in constant meshed engagement with pinion gear 116. Hypoid gear 118 is fixed for rotation with an output shaft 120. It is contemplated that output shaft 120 is drivingly coupled to a secondary drive line to provide torque to another set of driven wheels that are not associated with axle shafts 30.

FIG. 2 represents an alternate power take-off assembly 124 operable to transfer torque to another set of driven wheels other than those associated with axle shafts 30. Hypoid power take-off assembly 110 may be replaced with power take-off assembly 124 if a different gear packaging arrangement is desired. Power take-off assembly 124 includes an output gear 126 fixed for rotation with a support shaft 128. A crossed-axis, single enveloping worm gearset 130 transfers torque from output gear 126 to an output shaft 132.

Operation of transmission 10 includes transferring power from main shaft 14 selectively through various gearsets to provide first through sixth forward drive ratios as well as a reverse drive ratio. To provide power at the first gear drive ratio, a first power-operated clutch actuator 154 places first face mounted bi-directional shift clutch 140 in an active mode where relative rotation between first driven gear 54 and countershaft 24 causes first shift clutch 140 to lock and transfer torque. The remaining bi-directional shift clutches may remain or are placed in an inactive or over-running mode such that torque is not transferred from their respective gearsets to the shafts about which they rotate. Due to the dual input shaft arrangement previously described, second bi-directional shift clutch 142, fourth bi-directional shift clutch 146 and sixth bi-directional shift clutch 150 may be in their active mode positions with no detriment to transmission operation. This may occur because second input clutch 34 will be in the open or disengaged position during transmission operation in the first forward gear ratio. Dual clutch actuator unit 41 places first input clutch 32 in the engaged or torque transferring position. As such, torque is transferred from main shaft 14 through first input clutch 32 to first input shaft 20. Power continues to flow through first drive gear 52, first driven gear 54, first bi-directional shift clutch 140, countershaft 24, output drive gear 100, output driven gear 102, differential assembly 28 and axle shafts 30. If transmission 10 is equipped with a power take-off assembly, torque transfers therethrough as well.

Prior to transferring torque through transmission 10 at the second gear drive ratio, a sequential up-shift from the first gear drive ratio to the second gear drive ratio may be anticipated by pre-selecting the position of certain shift mechanisms. To pre-select a sequential up-shift from the first gear drive ratio to the second gear drive ratio, a second power-operated actuator 158 places second bi-directional shift clutch 142 in the active mode to drivingly couple second driven gear with countershaft 24.

Transmission 10 provides for power shifting between sequential drive ratio positions. To execute a power shift, a time overlap exists between disengagement of first input clutch 32 and engagement of second input clutch 34. Dual clutch actuator unit 41 causes simultaneous actuation and de-actuation of the clutches within dual clutch 12 to provide a smooth, uninterrupted flow of power to final drive 26. Once first input clutch 32 is completely disengaged, first bi-directional shift clutch 140 may be placed in the inactive mode. Because transmission 10 is equipped with a number of bi-directional shift clutches, pre-selection of a next anticipated gear drive ratio is not required but may be desired to minimize any power flow interruption.

A second gear to third gear shift is similarly accomplished. In particular, the third gear drive ratio may be pre-selected by energizing a third power-operated actuator 160 to place third bi-directional shift clutch 144 in the active mode to drivingly couple third driven gear 66 with countershaft 24. To shift from second gear to third gear, dual clutch actuator unit 41 disengages second input clutch 34 while first input clutch 32 is engaged. Once a third gear drive ratio is established, power flows from main shaft 14 through first input clutch 32, first input shaft 20, third drive gear 64, third driven gear 66, third bi-directional shift clutch 144, countershaft 24 and final drive 26 to differential assembly 28. Once the third gear drive ratio has been established, second bi-directional shift clutch 142 may be placed in the inactive mode.

It should be appreciated that additional sequential up-shifts may be completed in similar fashion to the shifts previously described. Fourth, fifth, sixth and seventh power-operated actuators 162, 164, 166 168 cooperate with fourth, fifth, sixth and seventh bi-directional shift clutches 146, 148, 150 and 152 to control transmission operation. Furthermore, transmission 10 is operable to shift from an odd numbered gear to an odd numbered gear or an even numbered gear to an even numbered gear due to the presence of the first through sixth bi-directional shift clutches.

To obtain the reverse gear ratio, seventh bi-directional shift clutch 152 is actuated by seventh power-operated actuator 168 to drivingly couple reverse driven gear 94 with countershaft 24. To launch in the reverse direction, first input clutch 32 is engaged. Power is transferred from main shaft 14 through first input clutch 32, first input shaft 20, reverse drive gear 88, reverse idler gear 90, reverse driven gear 94, seventh bi-directional shift clutch 152, countershaft 24 and final drive 26 to differential assembly 28.

Figures 3, 4:
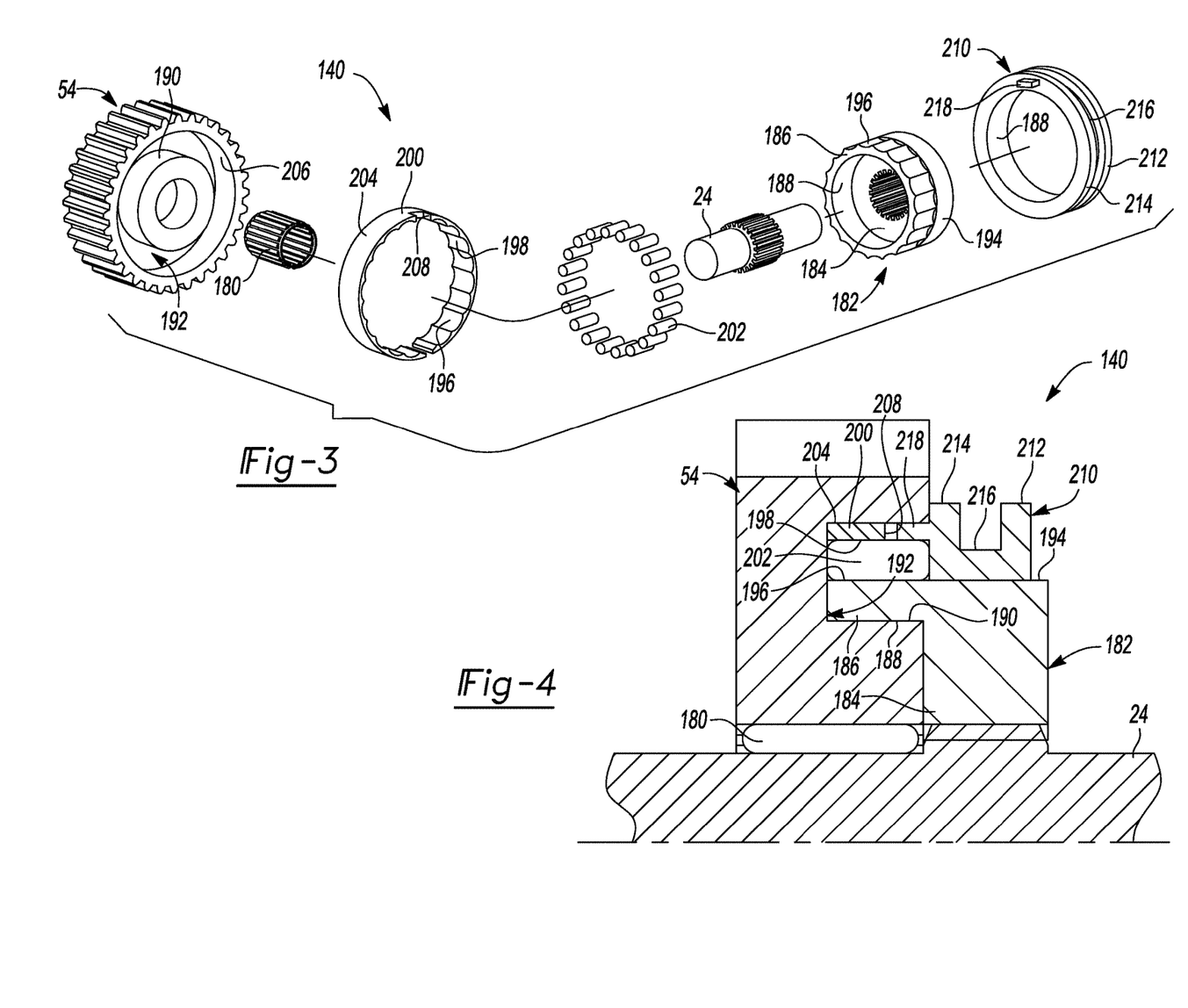
FIG. 3 is an exploded perspective view of a face mounted bi-directional shift clutch.
FIG. 4 is a fragmentary cross-sectional view of the shift clutch shown in FIG. 3.

FIGS. 3 and 4 depict first face mounted bi-directional shift clutch 140. The remaining bi-directional clutches are substantially similar to first face mounted bi-directional shift clutch 140 and will not be described in further detail. Bi-directional shift clutch 140 is a controllable, multi-mode, bi-directional overrunning roller clutch that is operable to selectively drivingly interconnect first driven gear 54 and countershaft 24. It should be appreciated that first bi-directional shift clutch 140 is used only as a torque transfer device and not for a gear mounting purpose. In this manner, first driven gear 54 may be accurately supported for rotation on countershaft 24 by a bearing 180. Accurate alignment of first driven gear 54 provides a desired mesh between first driven gear 54 and first drive gear 52 to assure proper torque transfer with minimal noise, vibration or harshness being generated by the gear teeth engagement.

Bi-directional shift clutch 140 includes a hub 182 having a body portion 184 positioned in splined engagement with countershaft 24. An extended ring portion or first ring 186 of hub 182 includes an inner cylindrical surface 188 concentrically mounted on or in close proximity to a cylindrical guide surface 190 partially defining an annular recess 192 in first driven gear 54. Body portion 184 includes an outer surface having a portion 194 that is shaped as a smooth cylinder. Axially-extending arcuate cam tracks 196 are formed on the outer surface of first ring 186 on hub 182 adjacent to cylindrical portion 194. A second ring or slider ring 200 is positioned within recess 192. A corresponding plurality of axially-extending arcuate cam tracks 198 are formed on an inner surface of slider ring 200. A like plurality of elongated cylindrical rollers 202 are retained within aligned sets of cam tracks 196 and 198. Slider ring 200 is a split ring having an outer cylindrical surface 204 selectively engageable upon expansion with an inner cylindrical surface 206 of recess 192. Slider ring 200 includes an actuation slot 208.

Bi-directional shift clutch 140 also includes a shifting sleeve 210 that is rotatably supported on cylindrical portion 194 of hub 182. Shifting sleeve 210 includes a first radially extending flange 212 and a second radially extending flange 214 spaced apart from one another to define a groove 216. A lug 218 axially extends from flange 214 toward actuation slot 208. Shifting sleeve 210 is axially moveable upon actuation of first power-operated actuator 154 between first and second positions. At the first axial position, lug 218 is positioned within actuation slot 208. When shifting sleeve 210 is moved to the second position, lug 218 is positioned outside of actuation slot 208. A shift fork (not shown) is positioned within groove 216. First power-operated actuator 154 is operable to translate the shift fork and move shifting sleeve 210 between its first and second positions. Movement of shifting sleeve 210 between its first and second positions places first bi-directional shift clutch 140 in one of the active and inactive modes. In particular, when shifting sleeve 210 is in the first position, lug 218 is positioned within actuation slot 208 to restrict relative rotation between slider ring 200 and hub 182. Thus, bi-directional shift clutch 140 is placed in its inactive mode where cam tracks 196, cam tracks 198 and cylindrical rollers 202 remain aligned with one another. As such, outer surface 204 of slider ring 200 remains spaced apart from inner surface 206 of first driven gear 54 to continue to allow relative rotation between countershaft 24 and first driven gear 54 regardless of the speed differential between these components.

When first power-operated actuator 154 is commanded to translate the shift fork and move shifting sleeve 210 to its second position, shift clutch 140 is placed in its active mode. In particular, lug 218 is positioned outside of actuation slot 208. As such, relative rotation between countershaft 24 and first driven gear 54 causes hub 182 to rotate relative to first driven gear 54 and slider ring 200. A limited amount of relative rotation between slider ring 200 and hub 182 occurs. This limited relative rotational movement causes rollers 202 to ride up the circumferentially indexed cam tracks 196 and 198 which, in turn, causes rollers 202 to exert a radially outwardly directed force on slider ring 200. As a result, the split slider ring 200 expands and its outer surface 204 is driven into frictional engagement with inner surface 206 of first driven gear 54. Accordingly, shift clutch 140 is locked and first driven gear 54 is drivingly coupled to countershaft 24 to transfer torque through transmission 10 at the first speed gear ratio. It will be appreciated that bi-directional overrunning roller clutch 140 can be used in virtually any power transmission assembly used in vehicular drivetrain applications for the purpose of selectively coupling first and second rotary members.

Figures 5, 6:
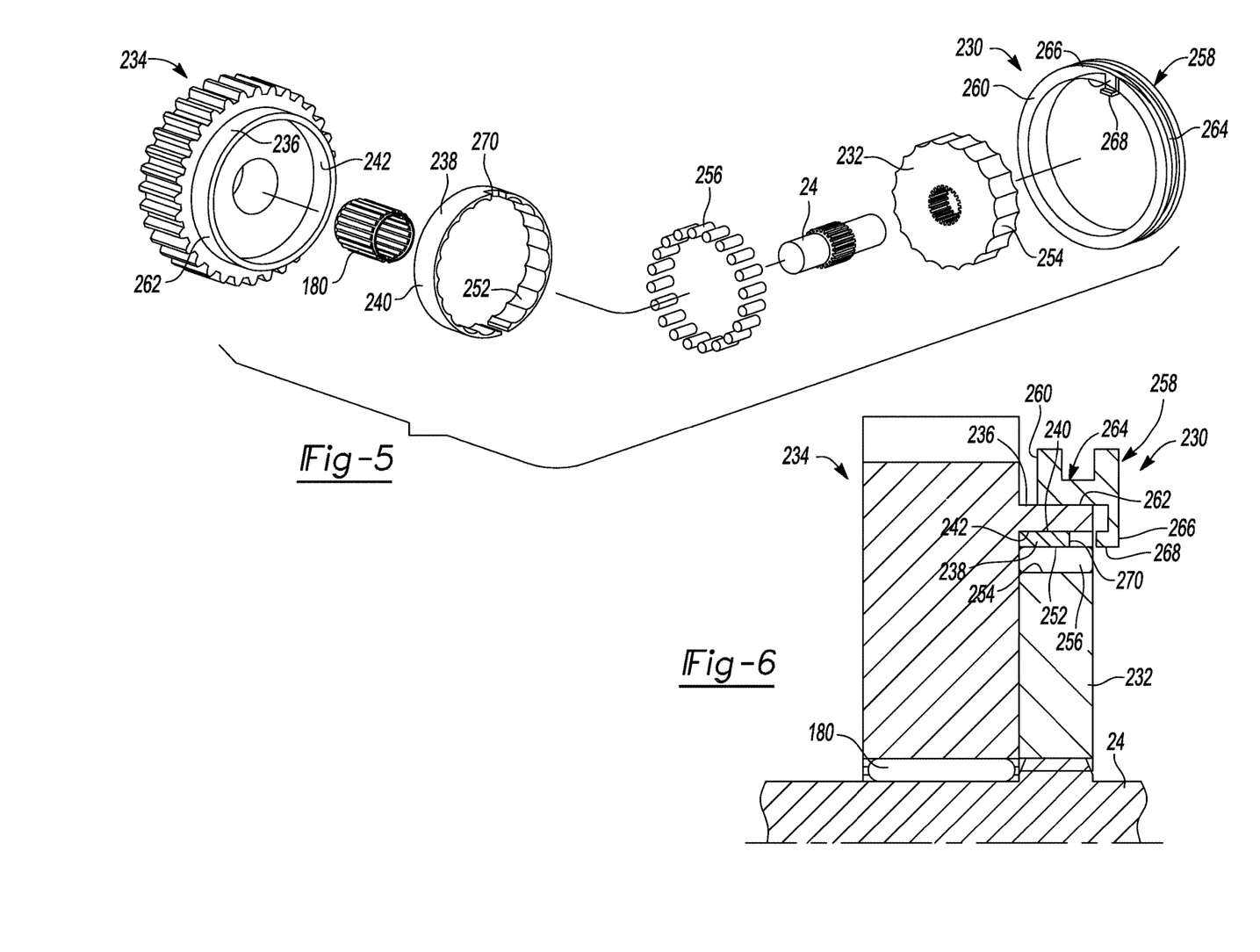
FIG. 5 is an exploded perspective view of another face mounted bi-directional shift clutch.
FIG. 6 is a fragmentary cross-sectional view of the clutch shown in FIG. 5.

FIGS. 5 and 6 depict another version of a bi-directional shift clutch at reference numeral 230. Bi-directional shift clutch 230 is substantially similar to clutch 140. Accordingly, similar elements will retain their previously introduced reference numerals. It should be appreciated that clutch 230 may be used in place of any one of previously mentioned bi-directional shift clutches 140, 142, 144, 146, 148, 150 and 152. Bi-directional shift clutch 230 includes a hub 232 in splined driving engagement with countershaft 24. Bearing 180 rotatably supports a driven gear 234 on countershaft 24. An axially extending ring portion 236 is integrally formed with driven gear 234. A split slider ring 238 includes an outer cylindrical surface 240 selectively drivingly engageable with an inner cylindrical surface 242 of ring portion 236. A plurality of cam tracks 252 are formed on an inner surface of slider ring 238. A corresponding set of axially extending cam tracks 254 are formed on an outer surface of hub 232. A plurality of rollers 256 are in alignment with sets of cam tracks 254 and 252. A shifting sleeve 258 includes a body portion 260 slideably supported on an external surface 262 of ring portion 236. A groove 264 is formed in body portion 260 to receive the shift fork. A leg 266 radially inwardly extends from body 260 substantially at a distance equal to a thickness of ring portion 236. A lug 268 axially extends from the distal end of leg 266 into an actuation slot 270 formed in slider ring 238. Shift clutch 230 functions substantially similarly to clutch 140 via axial translation of shifting sleeve 258 to establish active and inactive modes.

Figures 7, 8:
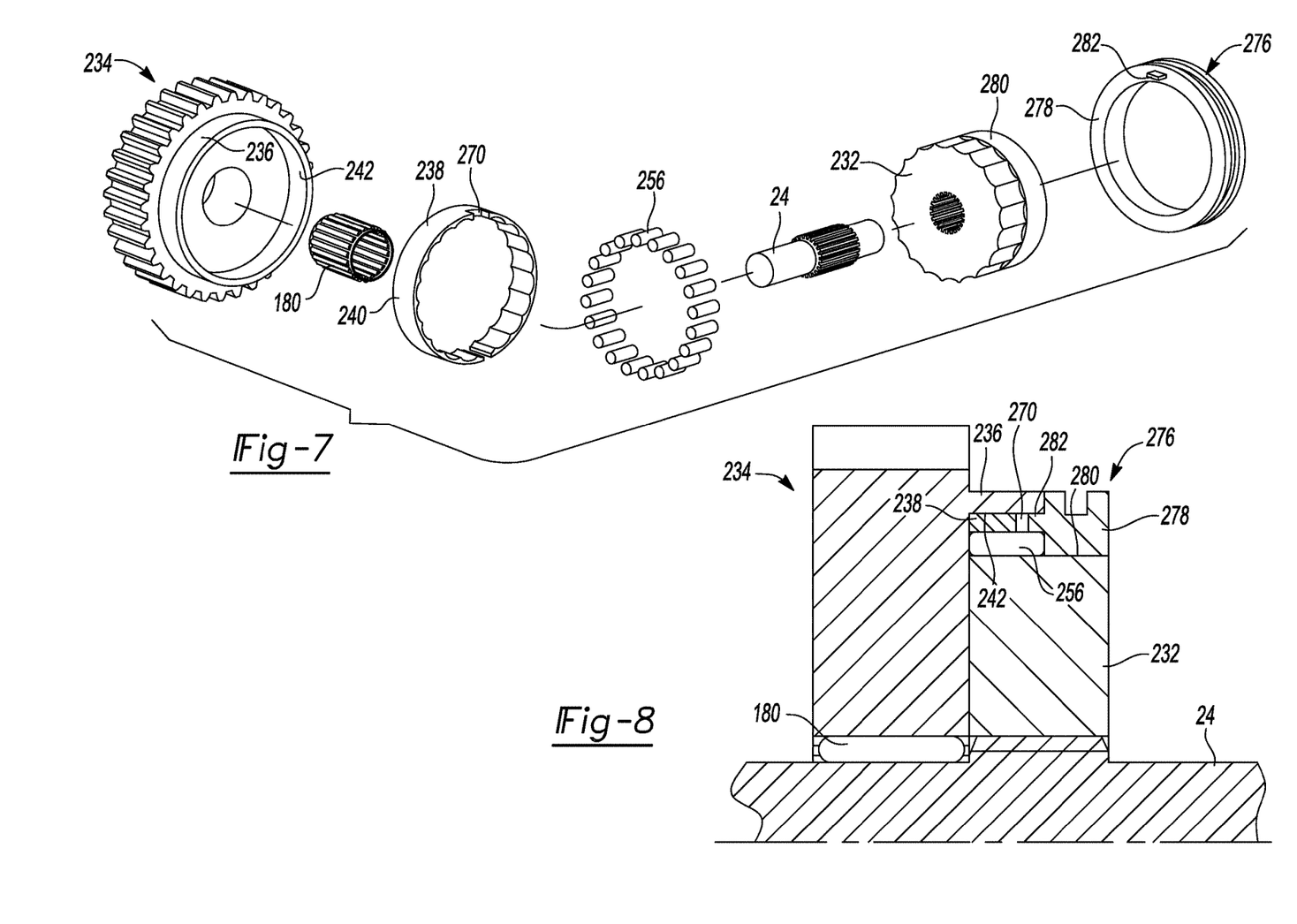
FIG. 7 is an exploded perspective view of another face mounted bi-directional shift clutch.
FIG. 8 is a fragmentary cross-sectional view of the clutch shown in FIG. 7.

FIGS. 7 and 8 depict another face mounted bi-directional shift clutch identified at reference numeral 276. Clutch 276 is substantially similar to clutch 230. As such, like elements will retain their previously introduced reference numerals. Clutch 276 differs from clutch 230 mainly in the configuration of a shifting sleeve 278 being supported on an outer substantially cylindrically shaped surface 280 of hub 232 instead of being supported on an outer surface of ring portion 236 on driven gear 234. An axially inwardly extending lug 282 extends from shifting sleeve 278 and can be selectively positioned within actuation slot 270 formed in split slider ring 238. Shifting sleeve 278 is axially translatable to selectively move lug 282 between first and second axial positions and place clutch 276 in one of its active and inactive modes.

Figure 9:
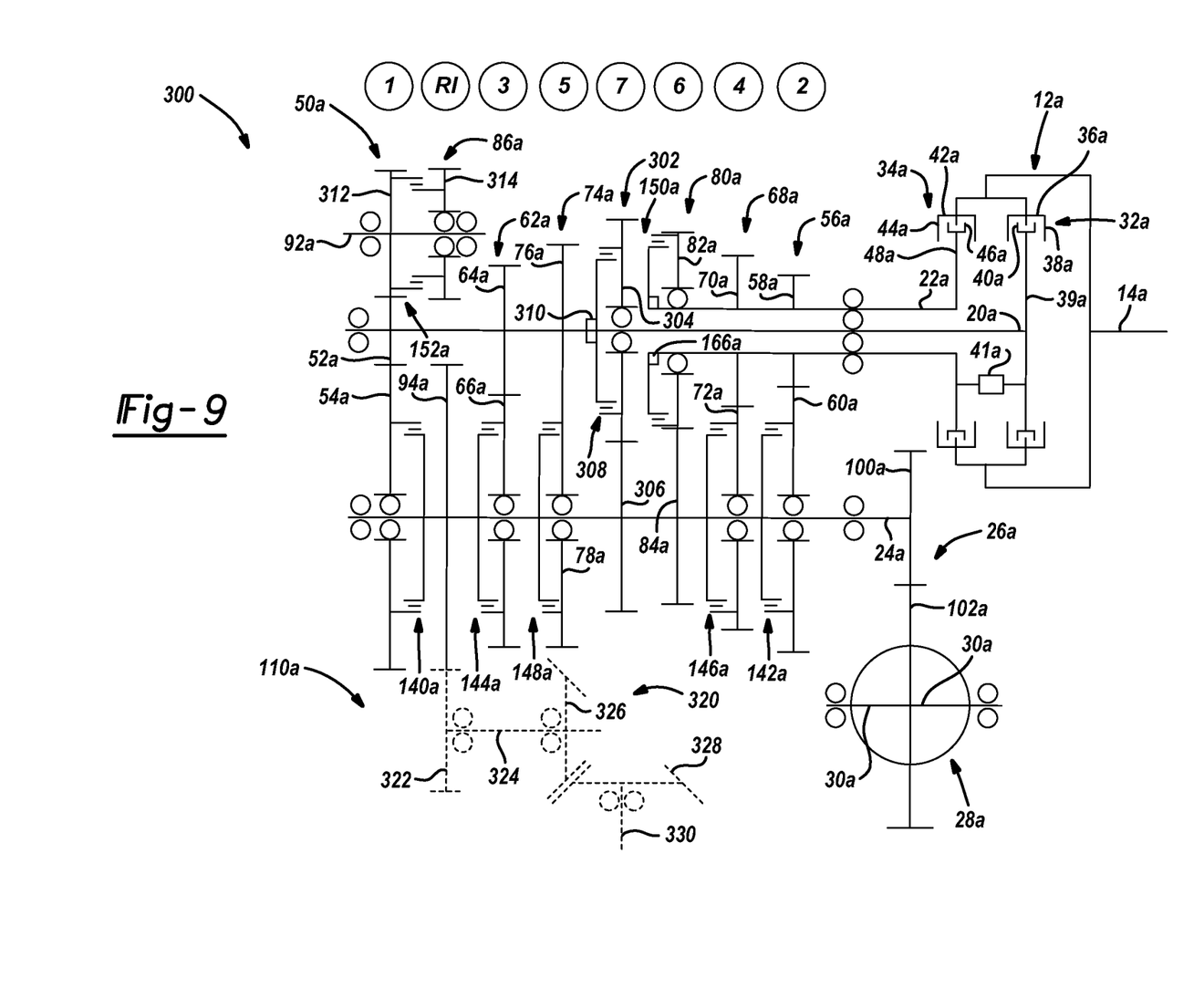
FIG. 9 is a schematic depicting a seven-speed, dual clutch transmission equipped with face mounted bi-directional shift clutches of the present invention.

FIG. 9 depicts a seven-speed automatic powershift transmission 300 equipped with individual bi-directional shift clutches associated with each speed gearset. Transmission 300 is substantially similar to transmission 10. As such, like elements will be identified with their previously introduced reference numerals having an "a" suffix. Transmission 300 differs from transmission 10 by including a seventh speed gearset 302 having a seventh drive gear 304 supported for rotation on first input shaft 20a and a seventh driven gear 306 fixed for rotation with countershaft 24a. Seventh drive gear 304 is in constant meshed engagement with seventh driven gear 306. Additionally, an eighth bi-directional shift clutch 308 is selectively moveable by an eighth power-operated actuator 310 to drivingly interconnect seventh drive gear 304 with first input shaft 20a. Further differences between the transmissions include fifth drive gear 76a being fixed for rotation with first input shaft 20a while fifth driven gear 78a is rotatably supported on countershaft 24a. Fifth bi-directional shift clutch 148a is also moved to coordinate with fifth driven gear 78a.

The gears associated with obtaining a reverse gear ratio are also different within transmission 300 when compared to transmission 10. In particular, a first reverse idler gear 312 is fixed for rotation with reverse idler shaft 92a and in constant meshed engagement with first drive gear 52a. A second reverse idler gear 314 is supported for rotation on idler shaft 92a. Second reverse idler gear 314 is in constant meshed engagement with reverse driven gear 94a. Reverse driven gear 94a is fixed for rotation with countershaft 24a. Seventh bi-directional shift clutch 152a is operable to drivingly interconnect second reverse idler gear 314 with idler shaft 92a to define the reverse gear ratio. Torque is transferred through transmission 300 to provide a reverse gear ratio by actuating first input clutch 32a to transfer torque from main shaft 14a through first input clutch 32a, first input shaft 20a, first drive gear 52a, first reverse idler gear 312, seventh bi-directional shift clutch 152a second reverse idler gear 314, reverse driven gear 94a, countershaft 24a and final drive 26a to differential assembly 28a. Transmission 300 may be equipped with an optional power take-off assembly 320.

Power take-off assembly 320 includes an output gear 322 in constant meshed engagement with reverse driven gear 94b. Output gear 322 is fixed for rotation with a pinion shaft 324 having a pinion gear 326 fixed at one end. A ring gear 328 is in constant meshed engagement with pinion gear 326 to provide torque to an output shaft 330. It should be appreciated that while power take-off assembly 320 is depicted as to include a bevel gear or hypoid gear assembly, other drive arrangements such as the cross axis single enveloping worm gearset 130 may be implemented without departing from the scope of the present disclosure.

Figure 10:
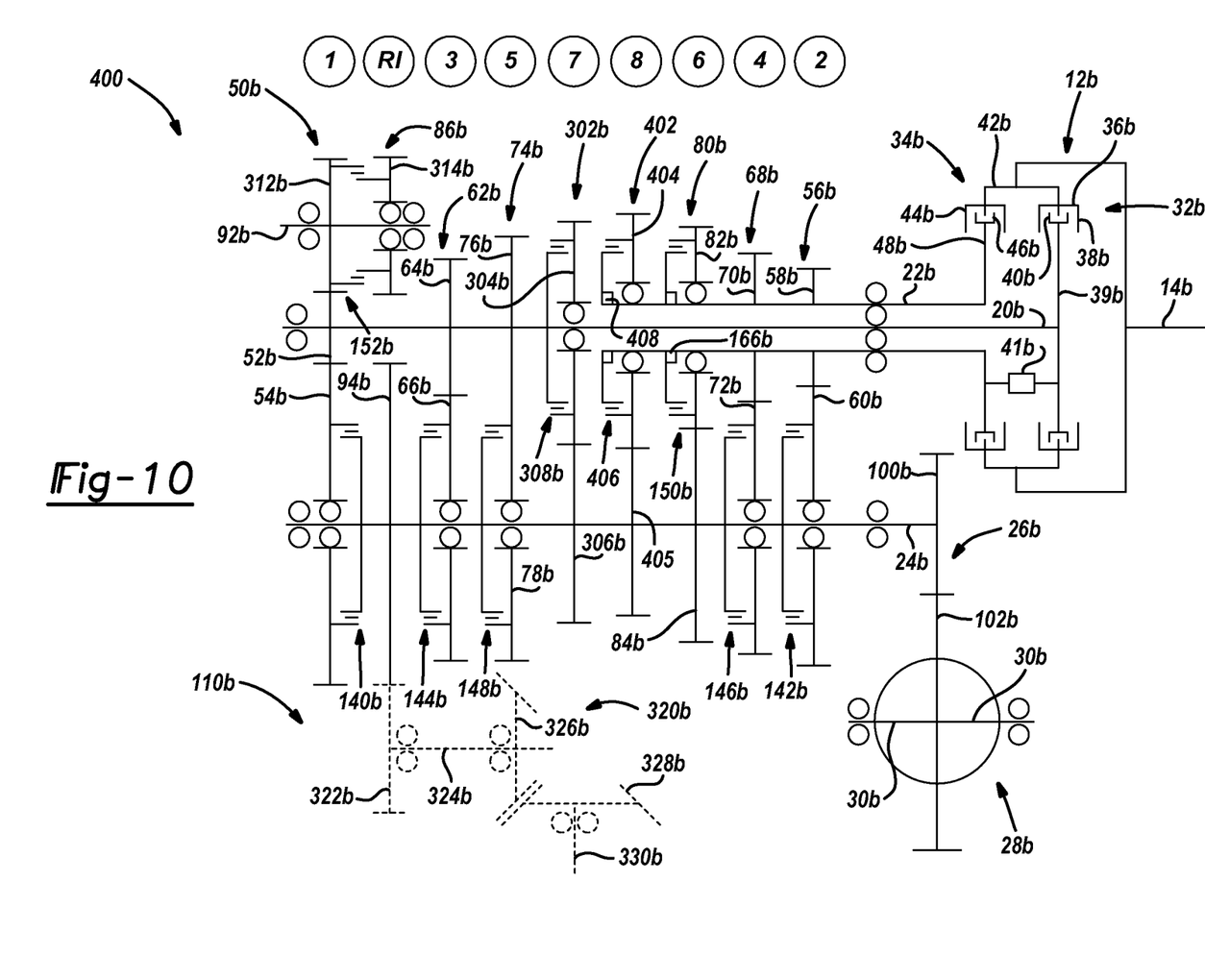
FIG. 10 is a schematic depicting an eight-speed, dual clutch transmission equipped with face mounted bi-directional shift clutches of the present invention.

FIG. 10 depicts an eight-speed automatic powershift transmission identified at reference numeral 400. Transmission 400 is equipped with individual bi-directional shift clutches associated with each speed gearset in a manner substantially similar to transmission 300. Transmission 400 differs from transmission 300 only in that an eighth speed gearset 402 is included to provide an eighth forward speed gear ratio. Eighth speed gearset 402 includes an eighth drive gear 404 supported for rotation on second input shaft 22b and an eighth driven gear 405 fixed for rotation with countershaft 24b. A ninth bi-directional shift clutch 406 is moveable by a ninth power-operated actuator 408 to selectively drivingly couple eighth drive gear 404 with second input shaft 22b to provide the eighth speed gear ratio. Transmission 400 may also be configured as a two wheel drive or all wheel drive device in the manner previously described.

Figure 11:
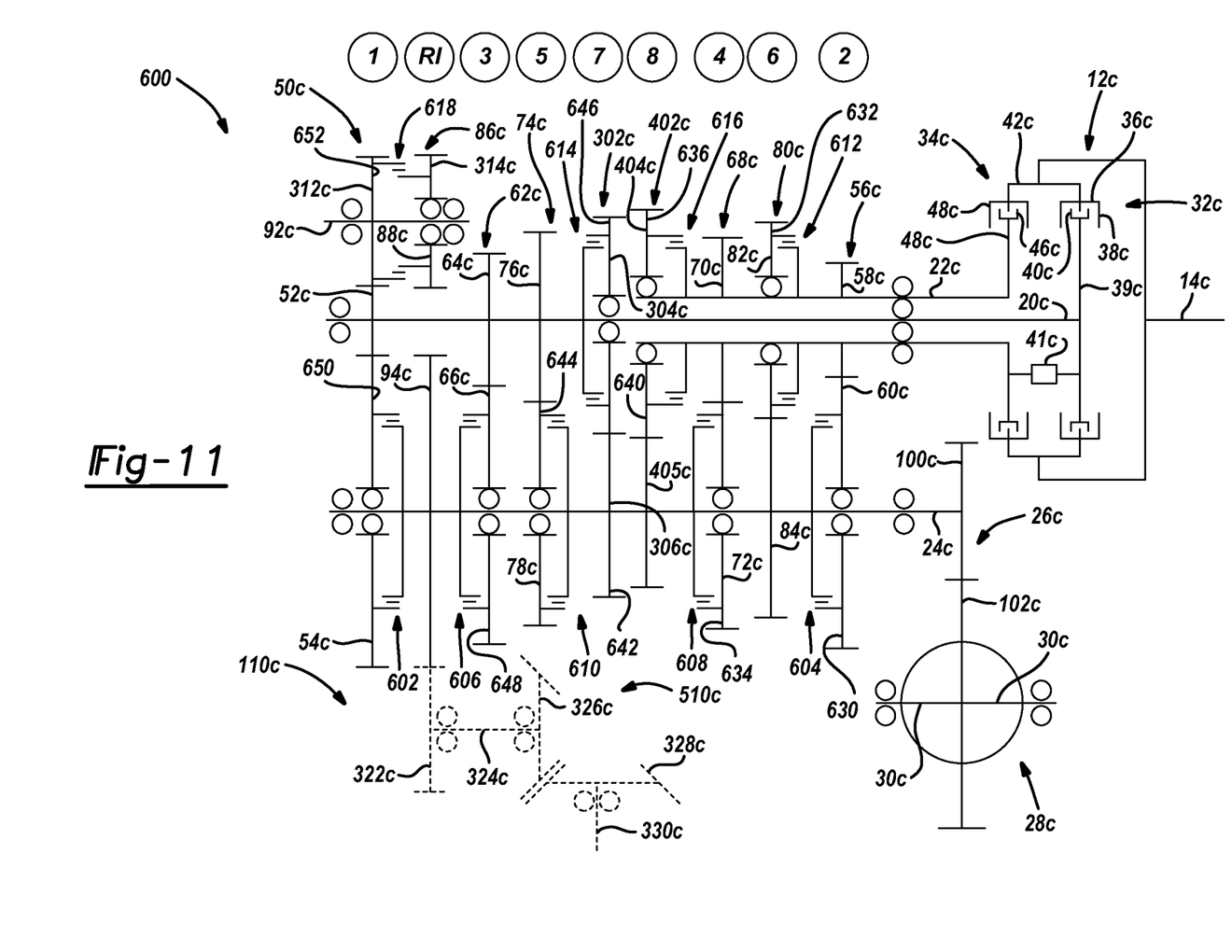
FIG. 11 is a schematic depicting an eight-speed, dual clutch transmission having nested gears and bi-directional shift clutches.

FIG. 11 depicts another eight-speed automatic powershift transmission having individual bi-directional shift clutches associated with each speed gearset and identified at reference numeral 600. The axial positioning of various speed gearsets has been varied when compared to the transmissions previously discussed to reduce the overall length of transmission 600. To further facilitate an axial length reduction, reduced diameter bi-directional shift clutches are used in conjunction with the larger of the drive or driven gear for a particular speed gearset such that at least a portion of the bi-directional shift clutch is nested within a pocket formed within the speed gear. The axial space occupied by a nested speed gear and bi-directional shift clutch arrangement is less than the space occupied by the other speed gear and bi-directional clutch combination. The speed gearsets are substantially similar to those previously described. As such, like elements will retain their previously introduced numerals including a "c" suffix.

The gearsets are arranged to not only minimize the overall axial length of transmission 600 but also the weight. As such, the length of second input shaft 22c may be minimized by positioning each of the even numbered gearsets closest to dual clutch 12c. From right to left as viewed in FIG. 11, the gearsets are axially arranged in sequence as second speed gearset 56c, sixth speed gearset 80c, fourth speed gearset 68c, eighth speed gearset 402c, seventh speed gearset 302, fifth speed gearset 74c, third speed gearset 62c, reverse speed gearset 86c and first speed gearset 50c. The relative axial position of the various bi-directional shift clutches to other bi-directional clutches as well as the axial position of each bi-directional shift clutch relative to its respective speed gear may also allow further nesting of components to reduce the axial length of transmission 600. Accordingly, the position of each bi-directional clutch will be described.

First through ninth bi-directional shift clutch and actuator assemblies 602, 604, 606, 608, 610, 612, 614, 616 and 618, are depicted in FIG. 11. The first through eighth bi-directional shift clutches are associated with the first through eighth speed gearsets, respectively. Ninth bi-directional clutch and actuator assembly 618 is associated with second reverse idler gear 314c. To reduce the axial length required to package second speed gearset 56c, sixth speed gearset 80c and their respective bi-directional shift clutches, second bi-directional shift clutch and actuator assembly 604 is positioned in cooperation with countershaft 24c axially between second speed gearset 56c and sixth speed gearset 80c. Sixth bi-directional clutch and actuator assembly 612 is also axially positioned between second speed gearset 56c and sixth speed gearset 80c but is positioned in cooperation with second input shaft 22c. The reduced axial length is achieved by positioning second bi-directional clutch and actuator assembly 604 within a pocket 630 formed in second driven gear 60c, positioning sixth bi-directional clutch and actuator assembly 612 within a pocket 632 formed in sixth drive gear 82c and at least partially axially overlapping second bi-directional clutch and actuator assembly 604 with sixth bi-directional clutch and actuator assembly 612.

Fourth speed gearset 68c, eighth speed gearset 402c, fourth bi-directional clutch and actuator assembly 608 and eighth bi-directional clutch and actuator assembly 616 are positioned in a similar nested arrangement. For example, fourth bi-directional clutch and actuator assembly 608 is positioned within a recess 634 formed in fourth driven gear 72c. Eighth bi-directional clutch and actuator assembly 616 is positioned within a recess 636 formed in eighth drive gear 404c. Fourth bi-directional clutch and actuator assembly 608 and eighth bi-directional clutch and actuator assembly 616 at least partially axially overlap with one another as well.

To further reduce the axial length of transmission 600, fifth speed gearset 74c, seventh speed gearset 302c, fifth bi-directional clutch and actuator assembly 610 and seventh bi-directional clutch and actuator assembly 614 are arranged as a nested package. It should also be appreciated that seventh speed gearset 302c may be positioned in at least a partially axially overlapping manner with eighth speed gearset 402c. In particular, seventh drive gear 304c is positioned within a pocket 640 formed in eighth drive gear 404c. Similarly, eighth driven gear 405c is positioned within a pocket 642 formed in seventh driven gear 306c.

Fifth bi-directional clutch and actuator assembly 610 is positioned within a pocket 644 formed in fifth driven gear 78c while seventh bi-directional clutch and actuator assembly 614 is positioned within a pocket 646 formed in seventh drive gear 304c. Fifth bi-directional clutch and actuator assembly 610 at least partially axially overlaps seventh bi-directional clutch and actuator assembly 614.

Other condensed packaging arrangements include positioning third bi-directional clutch and actuator assembly 606 within a pocket 648 formed in third driven gear 66c. First bi-directional clutch and actuator assembly 602 is positioned within a recess 650 formed in first driven gear 54c. Ninth bi-directional clutch and actuator assembly 618 is positioned within a recess 652 formed in first reverse idler gear 312c.

Transmission 600 may be configured to provide torque to a two wheel drive vehicle or may include a power take-off to provide drive torque to all four wheels of a vehicle. The power take-off may include a bevel gearset or a worm gear arrangement as shown in FIG. 2.

Figure 12:
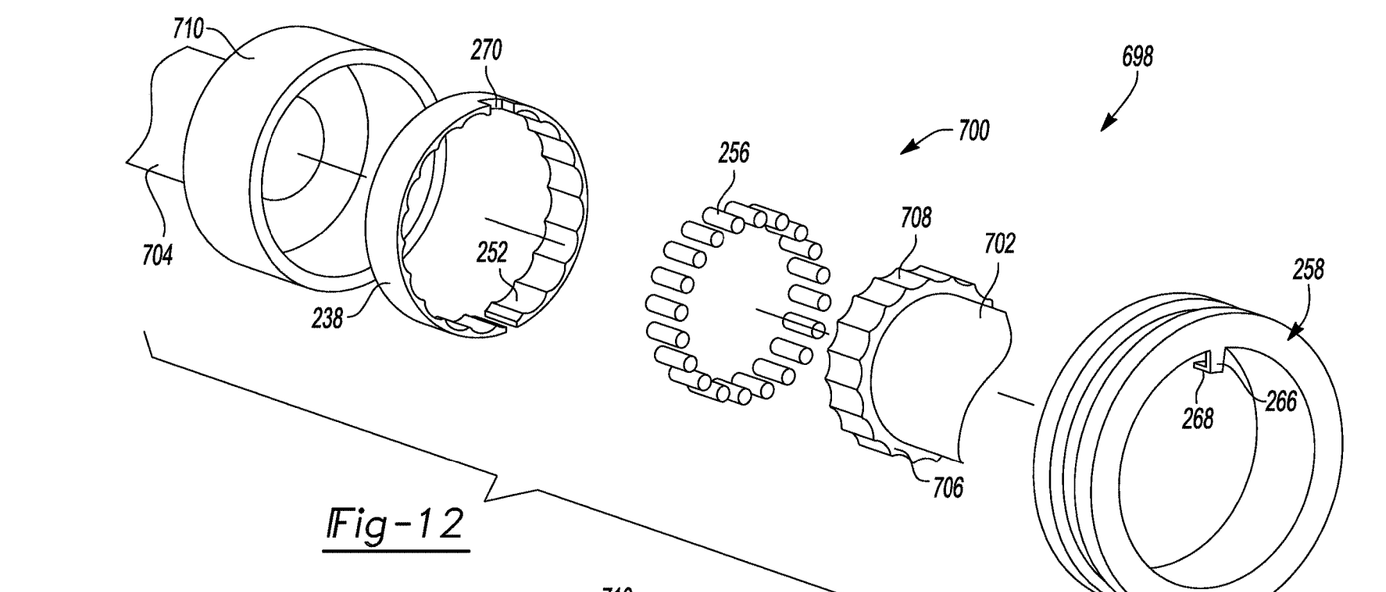
FIG. 12 is an exploded perspective view of a bi-directional clutch interconnecting rotatable shafts.
Figure 13:
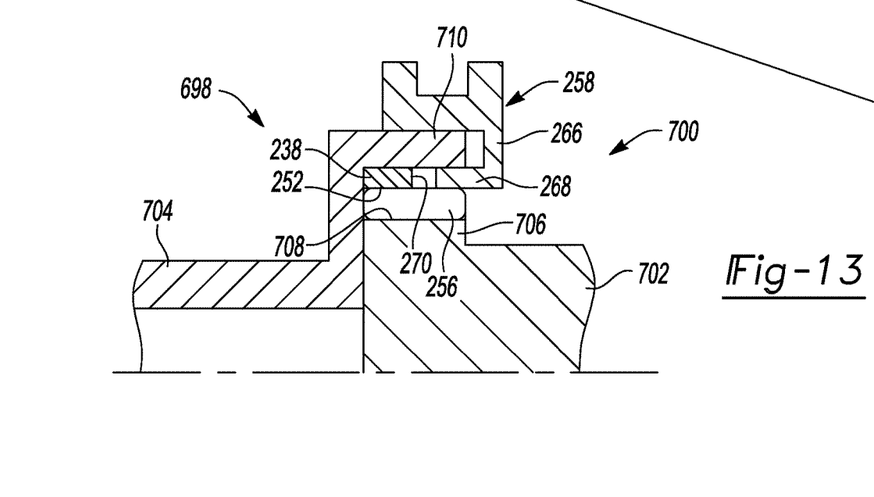
FIG. 13 is a fragmentary cross-sectional view of the clutch and shaft arrangement shown in FIG. 12.

FIGS. 12 and 13 depict a power transmission arrangement 698 having a face mounted bi-directional shift clutch 700 operable to selectively drivingly interconnect a first shaft 702 with a second shaft 704. The components of clutch 700 are substantially similar to those previously described in relation to clutch 230. Differences between the arrangements include a hub 706 being fixed to or integrally formed with first shaft 702. Cam tracks 708 are formed on hub 706. A drum 710 is fixed to or integrally formed with second shaft 704. The remaining components of clutch 700 are substantially similar to the components of clutch 230 and are identified with like numerals.

Figures 14, 15:
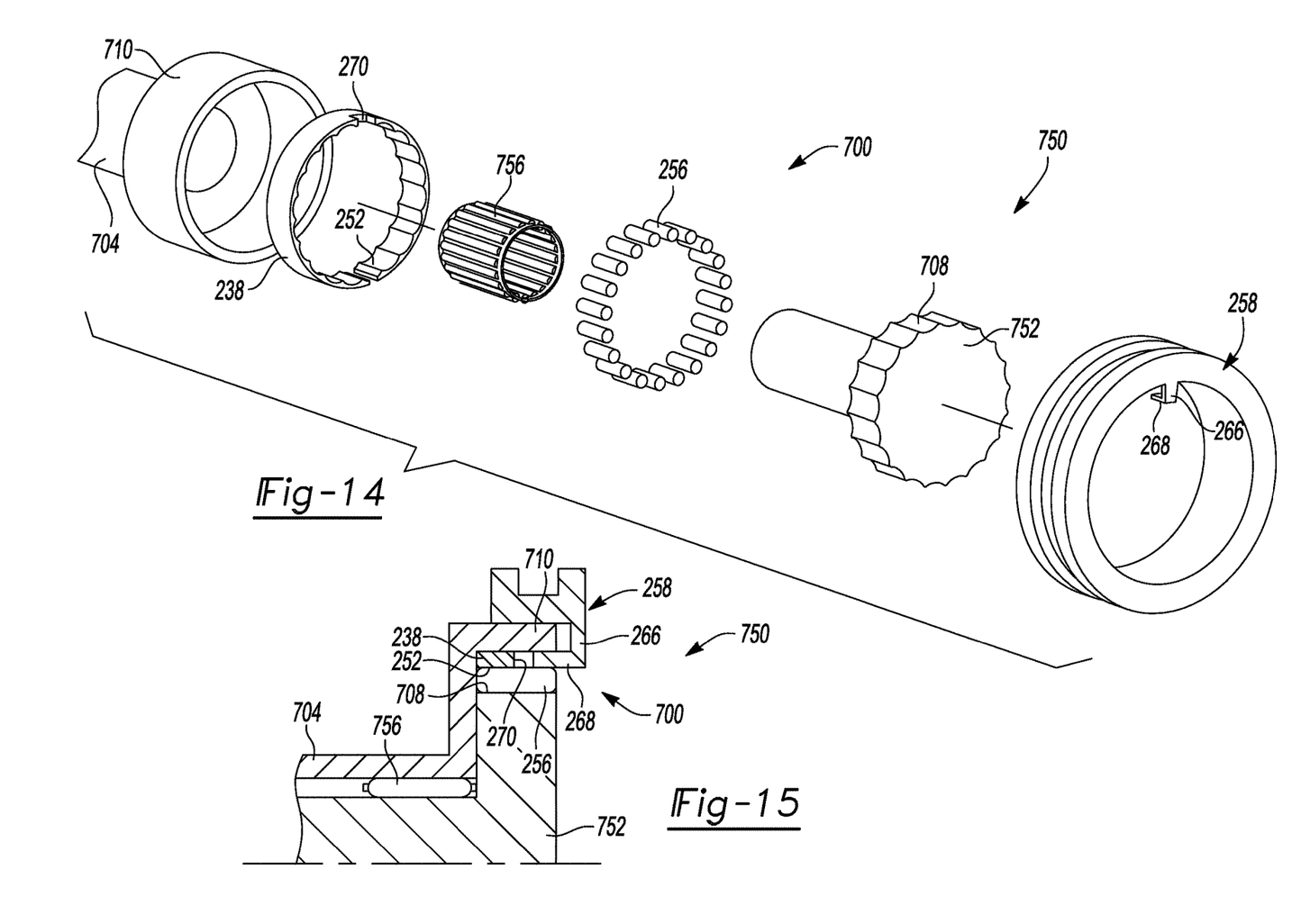
FIG. 14 is an exploded perspective view of a bi-directional clutch drivingly interconnecting telescopically arranged shafts.
FIG. 15 is a fragmentary cross-sectional view of the shaft and clutch arrangement shown in FIG. 14.

FIGS. 14 and 15 depict another power transmission arrangement 750 including bi-directional clutch 700 selectively drivingly interconnecting a first shaft 752 with second shaft 704. Shafts 752 and 704 are positioned in a telescopic manner with second shaft 704 rotatably supported on first shaft 752 by a bearing 756. Clutch 700 depicted in FIGS. 12 through 15 functions substantially similarly to clutch 230 previously described.

Other features of the bi-directional shift clutches previously described include that the hub, ring/drum and slider ring can be interchangeably internal or external in form. The lug that is set between the seam or split in the slider ring may be mounted on or in unison with the hub and can be integral with the axially shifting sleeve.

Each face mounted bi-directional shift clutch can be modified for length and diameter based on packaging and torque requirements, since the gear radial location is supported by a bearing surface or assembly. The roller diameter, length and count are determined by the torque requirement, clutch housing diameter and length as well as the friction coefficient between the slider ring and the hub or drum. The ramp angle and form of the cam racks controls the radial force of the roller, engagement/disengagement rate, and slider ring to hub clearance gap for drag torque or efficiency.

For automotive torque applications, most components may be produced with metal material. The cam tracks can be integral, inserted or attached to the drive or the driven members. Many cam track details can be processed with powdered metal technology, stamping, rolling, forging, broaching, EDM, milling, grinding, shaping, or hobbing. The disengaging/engaging shifting sleeve may also be made from molded plastic with an integral metal lug encased therein. This will eliminate the need for nylon padding of metal shifting forks. The entire assembly can be produced with plastics for low torque applications. The face mounted bi-directional shift clutch may be a direct replacement for the traditional synchronizer/clutch assembly.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A power transmission device comprising:
   a rotary input member adapted to receive drive torque from a source of torque;
   a rotary output member adapted to provide drive torque to an output device; and
   a bi-directional roller clutch having a first ring fixed for rotation with one of the rotary input member and the rotary output member, a second ring spaced apart from the other of the rotary input member and the rotary output member, and rollers positioned in aligned cam tracks formed in facing surfaces of the first and second rings, wherein neither the first nor second ring support one of the rotary members or the other rotary member relative to the other, the second ring adapted to circumferentially index relative to the first ring to cause the rollers to ride up the cam tracks and cause the second ring to frictionally engage the other of the rotary input member and the rotary output member;
   wherein one of the rotary input member and the rotary output member includes a body having a toothed perimeter and a recess defined axially and radially within the toothed perimeter, the recess in receipt of the first ring, the second ring, and the rollers.

2. The power transmission device of claim 1 further including an axially moveable shifting sleeve supported by one of the first and second rings.

3. The power transmission device of claim 2 wherein the shifting sleeve includes a lug positionable within an actuation slot formed in the second ring to place the bi-directional roller clutch in an over-running mode.

4. The power transmission device of claim 1 wherein the first ring includes a body portion fixed for rotation with the rotary output member and positioned adjacent the rotary input member.

5. The power transmission device of claim 3, wherein the lug of the shifting sleeve is the only lug of the shifting sleeve positionable within the actuation slot.

6. A power transmission device comprising:
   a rotary input member adapted to receive drive torque from a source of torque;
   a rotary output member adapted to provide drive torque to an output device; and
   a bi-directional roller clutch having a first ring fixed for rotation with one of the rotary input member and the rotary output member, a second ring spaced apart from the other of the rotary input member and the rotary output member, and rollers positioned in aligned cam tracks formed in facing surfaces of the first and second rings, wherein neither the first nor second ring support one of the rotary members or the other rotary member relative to the other, the second ring adapted to circumferentially index relative to the first ring to cause the rollers to ride up the cam tracks and cause the second ring to frictionally engage the other of the rotary input member and the rotary output member;
   wherein one of rotary input member and the rotary output member includes a body having a toothed perimeter and a drum portion axially extending beyond the body;
   further comprising an axially moveable shifting sleeve supported on an outer surface of the drum portion or an outer surface of the first ring, wherein translation of the shifting sleeve places the bi-directional roller clutch in one of an active mode and an inactive mode.

7. The power transmission device of claim 6 wherein the axially moveable shifting sleeve is supported on the outer surface of the drum portion.

8. The power transmission device of claim 7 wherein the shifting sleeve includes a radially extending leg having a distal end fixed to an axially extending lug, the lug being selectively positionable within an actuation slot formed in the second ring to place the bi-directional roller clutch in the inactive mode.

9. The power transmission device of claim 6 wherein the second ring is axially captured between one of the rotary input member and the rotary output member and the shifting sleeve.

10. The power transmission device of claim 6 wherein the first ring axially extends beyond the drum portion and supports the axially moveable shifting sleeve.

11. A clutch system comprising:
    a first rotary member adapted to one of receive drive torque from a source of torque or provide drive torque to an output device;
    a second rotary member adapted to the other of receive drive torque from a source of torque or provide drive torque to an output device; and
    a bi-directional roller clutch having a first ring fixed for rotation with the first rotary member, a second ring spaced apart from the second rotary member, and rollers positioned in aligned cam tracks formed in facing surfaces of the first and second rings, the second ring adapted to circumferentially index relative to the first ring to cause the rollers to ride up the cam tracks and cause the second ring to frictionally engage the second rotary member;
    further including an axially moveable shifting sleeve supported by one of the first ring or the second rotary member, wherein the shifting sleeves includes a single lug positionable within an actuation slot formed in the second ring, the single lug being the only lug of the shifting sleeve positionable within the actuation slot.

12. The clutch system of claim 11, wherein neither the first nor second ring support one of the rotary members or the other rotary member relative to the other.

13. The clutch system of claim 11, wherein the second rotary member includes a body having a toothed perimeter and a drum portion axially extending beyond the body.

14. The clutch system of claim 13, wherein the shifting sleeve is supported on an outer surface of the drum portion, wherein translation of the shifting sleeve places the bi-directional roller clutch in one of an active mode and an inactive mode.

15. The clutch system of claim 14, wherein the shifting sleeve includes a radially extending leg having a distal end fixed to the lug, which is axially extending, the lug being selectively positionable within the actuation slot formed in the second ring to place the bi-directional roller clutch in the inactive mode.

16. The clutch system of claim 11, wherein the second rotary member includes a recess in receipt of the first ring, the second ring and the rollers.

17. The clutch system of claim 16, wherein the shifting sleeve is supported on an outer surface of the first ring, and wherein translation of the shifting sleeve places the bi-directional roller clutch in an over-running mode.

18. The clutch system of claim 13, wherein the first ring axially extends beyond the drum portion and supports the axially moveable shifting sleeve.

19. The clutch system of claim 11, wherein one of the first rotary member and the second rotary member includes a body having a toothed perimeter and a recess defined axially and radially within the toothed perimeter, the recess in receipt of the first ring, the second ring, and the rollers.

\* \* \* \* \*